United States Patent [19]
Jacobson et al.

[11] 3,868,505
[45] Feb. 25, 1975

[54] METHOD AND APPARATUS FOR INVESTIGATING THE QUALITY OF WELL LOGGING DATA

[75] Inventors: Larry A. Jacobson, Houston; Warren B. Wall, Pasadena; Charles Wilkin Johnstone, Houston, all of Tex.

[73] Assignee: Schlumberger Technology Corporation, New York, N.Y.

[22] Filed: Oct. 31, 1973

[21] Appl. No.: 411,189

[52] U.S. Cl.................. 250/269, 250/264, 250/270
[51] Int. Cl............................................. G01v 5/00
[58] Field of Search ............ 250/262, 264, 269, 270

[56] References Cited
UNITED STATES PATENTS
3,559,163   1/1971   Schwartz......................... 250/262 X
3,609,366   9/1971   Schwartz............................ 250/262

Primary Examiner—Archie R. Borchelt
Attorney, Agent, or Firm—Brumbaugh, Graves, Donohue & Raymond

[57] ABSTRACT

Apparatus and methods are disclosed for investigating the quality of well logging data derived from a well tool of the type which repetitively irradiates an earth formation with pulses of neutrons, generates signals representative of the resulting neutron population in the formation between neutron pulses, derives a downhole measurement of a characteristic of the formation in response to the neutron population signals, and transmits to the earth's surface signals representative of the formation characteristic measurement and of the generated neutron population signals. A representation of the quality of the downhole formation characteristic measurement and of signal transmission to the surface is obtained, either at the well site or remotely, from the neutron population signals received at the surface. In the illustrative embodiments described, the downhole measurement of the formation characteristic is made by comparing the background-corrected counting rates from two measurement intervals between neutron pulses and adjusting the times of occurrence and durations of the intervals until the two counting rates are in a predetermined relationship to each other. A like comparison of counting rates is formed at the surface from the transmitted neutron population signals, and deviations of this surface comparison from the predetermined relationship established between the downhole counting rates affords information as to the quality of signal transmission to the surface and of the accuracy of the downhole formation characteristic measurement. If desired, a separate measurement of the formation characteristic may be made at the surface and the quality representation obtained by comparing the downhole measurement and the surface measurement.

21 Claims, 4 Drawing Figures

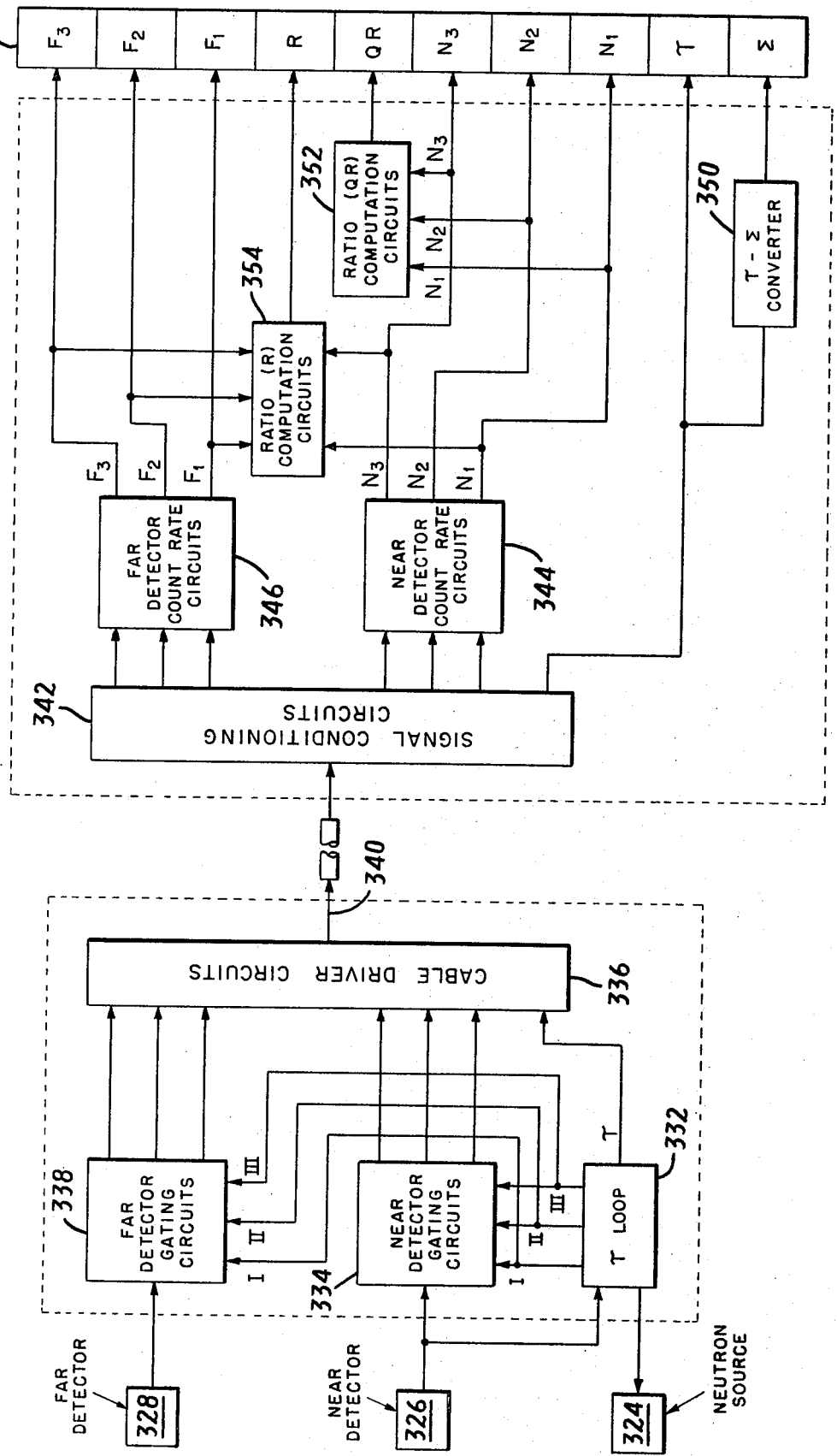

METHOD AND APPARATUS FOR INVESTIGATING THE QUALITY OF WELL LOGGING DATA

BACKGROUND OF THE INVENTION

1. Field of the Invention

This invention relates in general to pulsed neutron logging of earth formations and, in particular, to novel apparatus and methods for investigating the quality of well logging data derived at least in part in downhole equipment and of the quality of cable transmission to the earth's surface from such downhole equipment.

2. The Prior Art

As is well known, pulsed neutron logging has become an important well logging technique, particularly in cased holes. Previous neutron logging tools have provided useful measurements of various earth formation characteristics of interest, such as, for example, the macroscopic capture cross section ($\Sigma$) for thermal neutrons, the thermal neutron decay time ($\tau$), and the neutron slowing down time. One advantageous construction of such a prior art tool is disclosed in U.S. Pat. No. 3,662,179, issued May 9, 1972, to Arthur H. Frentrop et al., and assigned to the assignee of the present application. In the Frentrop et al. tool, the repetition rate and the duration of the neutron bursts, or pulses, as well as the measurement periods upon which the $\Sigma$ and $\tau$ measurements are based, are regulated automatically through downhole circuits in response to measured values of neutron characteristics, e.g., $\tau$, of the formations being logged. This downhole approach to the control of the pulsing and measuring periods, by optimizing the employment of the neutron source and the placement of the measuring periods for the particular characteristics of the formation under study, affords higher logging speeds and better quality logs than do other prior art devices. Moreover, more recent developments in connection with neutron tools employing downhole circuits of this type have provided still further information of value in formation analysis. For instance, in the copending, commonly-owned U.S. application Ser. No. 356,151, filed May 1, 1973, of William B. Nelligan, entitled "Two Detector Pulsed Neutron Porosity and Water Salinity Apparatus and Methods," there is described a neutron logging tool which, with the addition of a second radiation detector, provides measurements of formation porosity and water salinity, from which water saturation values may be estimated. With such continuing development of neutron logging tools and techniques, it has become increasingly important to ascertain the validity or quality of the well logging data which they afford. That is to say, it is important that information be available to the log analyst which will validate the accuracy of the logging data or, if inaccuracies are present, which will enable him to identify the errors and take them into account in his analysis.

As described in the copending, commonly-owned application of C. W. Johnstone, Ser. No. 356,150, filed May 1, 1973, and entitled "Neutron Logging Reliability Techniques and Apparatus," validating procedures are available which enable evaluation of the influence of neutron diffusion and other perturbational effects on the measurement of $\Sigma$, $\tau$, and other formation neutron characteristics, and for deriving corrected values of such characteristics where necessary. While these procedures afford important and valuable reliability information as to certain logging data, other ways of providing such information are desired, as are like information as to the quality of still other logging data, validating information which is indicative of the influence of other borehole variables, and information as to the accuracy, or fidelity, of cable telemetry.

SUMMARY OF THE INVENTION

It is therefore an object of the invention to provide new and useful apparatus and methods for furnishing information as to the quality of neutron logging data.

It is another object of the invention to afford quality control techniques for enabling validation of neutron logging data either at the well site or remotely.

Still another object of the invention is to provide information as to the operational reliability of downhole logging equipment and of the quality of telemetry between downhole equipment and the earth's surface.

A more particular object of the invention is to furnish information as to the validity of recorded values of formation characteristics which are based at least in part upon neutron logging measurements made downhole during a logging run.

The foregoing and other objects of the invention are attained, in accordance with the invention, by observing the neutron populations in a formation of interest resulting from irradiation of the formation with pulses of neutrons, measuring in the well tool a characteristic of the formation as a function of the observed neutron populations, transmitting to the earth's surface signals representative of the well tool measurement and the observed neutron populations, and deriving at the surface, in response to the transmitted neutron population signals, a representation which is functionally related to the quality of at least one of the downhole measurements and the quality of signal telemetry to the surface. The quality representation may be derived and logged at the well site, or it may be determined remotely based on stored representations of the logging signals generated by the downhole equipment.

In one embodiment, a second measurement of the formation characteristic may be made at the earth's surface, and the quality representation obtained by comparing the downhole and surface measurements. Close agreement between the two measurements indicates that the downhole measurement is accurate and that cable transmission losses have not been significant. On the other hand, if the uphole and downhole measurements are not in agreement, this is an indication that the downhole measurement is erroneous or that signal transmission losses have occurred. If desired, the entire signal train generated in the downhole equipment in response to the observed neutron populations may be sent uphole or only selected portions of that signal train may be transmitted. In either event, the surface-derived quality representation is indicative of the extent of distortion in the surface-received signals. As the surface-received signals are typically applied to other signal processing circuits for use in deriving additional logging data, the quality representation afforded by the invention is also useful in validating such additional data.

According to another embodiment of the invention, the downhole formation characteristic measurement is made by measuring the neutron population in the formation during two time intervals between neutron pulses and adjusting the durations and times of occurrence of the two intervals so as to maintain the counting rates from the respective intervals in a predetermined relationship to one another. A measurement of a neutron characteristic, e.g., $\tau$, is then derived from the duration of one of the time intervals. At the earth's surface, a like comparison of the time interval counting rates is formed from the neutron population signals transmitted uphole. Since basically the same comparison is formed in the downhole $\tau$ measurement, the uphole counting rate comparison result should be essentially the same as that of the downhole comparison. Here again, if the surface and downhole comparisons are in substantial agreement, this evidences the accuracy of the downhole $\tau$ determination and that signal losses on the cable have been insubstantial. Conversely, deviation of the surface comparison from the expected result implies an incorrect $\tau$ determination downhole or possible signal transmission losses.

It will be appreciated, therefore, that the present invention affords quality control information which is useful in validating the accuracy of logging values of $\tau$, $\Sigma$ and other neutron logging data. This information also affords a reliability control check on the operation of downhole measuring and neutron pulse control circuits, thereby further providing a confidence factor regarding the response of the overall logging system and the validity of the data derived therefrom.

BRIEF DESCRIPTION OF THE DRAWINGS

Further objects and advantages of the invention will be apparent from the following detailed description of exemplary embodiments thereof, taken in conjunction with the accompanying drawings, in which:

FIG. 3 schematically depicts still another embodiment of the invention, illustrating the addition of a second downhole radiation detector and of representative surface circuitry for providing quality control information and other logging data of a type which may be validated by the quality control information.

DESCRIPTION OF EXEMPLARY EMBODIMENTS

Figure 1:
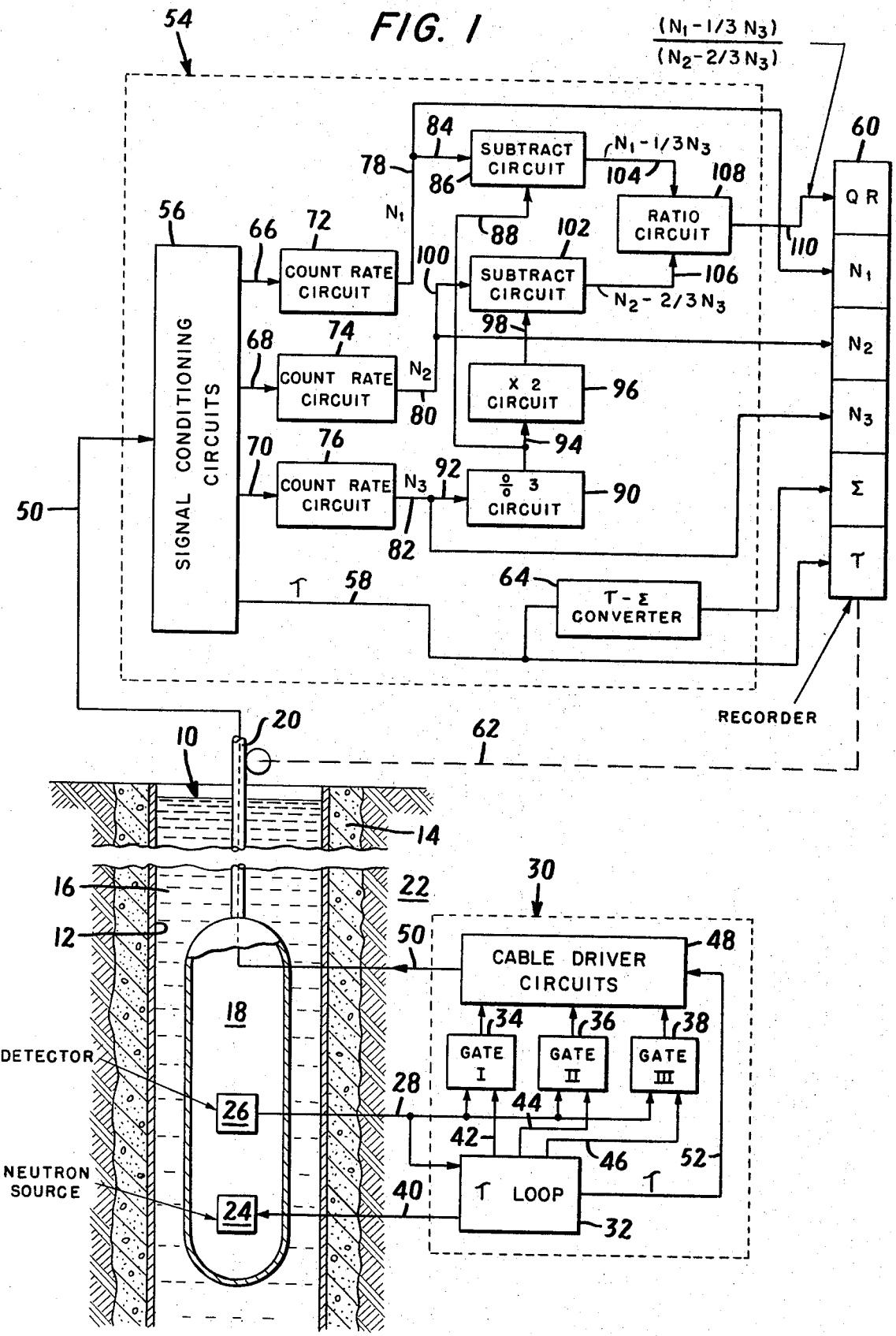
FIG. 1 is a schematic block diagram of an illustrative embodiment of the invention.

FIG. 1 depicts a typical cased borehole 10, having the usual steel casing 12, cement annulus 14 and well fluid 16. A logging system constructed in accordance with the invention includes a fluid and pressure-tight well tool 18 that is adapted to be moved through the casing 12 by means of an armored cable 20 and winch mechanism (not shown) for investigating a subsurface earth formation 22 traversed by the borehole 10. Although no tubing is illustrated in FIG. 1, the tool preferably is sized, e.g., 1 11/16 inches diameter, for through-tubing use.

The tool 18 encloses, preferably at its lower end, a pulsed neutron source 24 and, spaced at an appropriate distance thereabove, a radiation detector 26. The neutron source 24 is adapted to generate discrete pulses of high-energy neutrons, e.g., 14 Mev, and suitably may be of the types described in more complete detail in U.S. Pat. No. 2,991,364 to Goodman, dated July 4, 1961, or U.S. Pat. No. 3,546,512, granted to Frentrop on Dec. 8, 1970, both commonly owned with this application. The radiation detector 26 is positioned to respond in proportion to the density of thermal neutrons in the formation 22 and, to that end, may be of the thermal neutron-sensitive type, e.g., a helium-3 filled proportional counter, or of the gamma ray-sensitive type, e.g., embodying a sodium iodide scintillation crystal, adapted to respond to gamma radiation resulting from the capture of thermal neutrons by nuclei of formation elements. For purposes of illustration herein, the detector 26 is assumed to be a sodium iodide-type gamma radiation detecting device, and will be understood to be coupled in conventional fashion to a photomultiplier tube (not shown) for conversion of the radiation-related light impulses produced by the scintillation crystal into electrical output signals.

Conventional amplification and discrimination circuitry (not shown) is provided in association with the detector 26 for further processing the detector signals and for eliminating background noise and other extraneous signals. The processed detector signals are sent over a conductor 28 to further signal processing circuitry 30 located in the well tool.

As illustrated in FIG. 1, the detector signals are applied within the circuitry 30 to a signal processing loop 32 and to one input of each of three gate circuits 34, 36 and 38. The loop 32 functions to derive a measurement of a neutron absorption characteristic, e.g., the thermal neutron decay time ($\tau$), of the formation 22 from the neutron population signals received over the conductor 28 and subsequently to control the operation of the neutron source 24 and the gating of the detector 26 as a function of the measured value of the neutron characteristic. It may take any construction appropriate to the performance of those functions. For example, the circuitry of the aforementioned Frentrop et al. U.S. Pat. No. 3,662,179 may be employed.

Briefly, the $\tau$ loop 32 solves for a value of $\tau$ by measuring the rate of decay (absorption) of thermal neutrons in the formation opposite the location of the detector 26. According to a preferred measurement sequence, successive neutron pulses, of one decay time ($\tau$) duration, are spaced from each other by intervals of 10 decay times ($10\tau$) in length. The neutron population is observed, i.e., the number of individual gamma ray events registered in the detector 26 is counted, during a measurement period encompassing three separate time intervals, or gates, between neutron pulses. A first population count rate $N_1$ is taken during an interval I one decay time ($\tau$) long that begins 2 decay times ($2\tau$) after the preceding neutron pulse has terminated. The second time interval II, during which a second neutron population count rate $N_2$ is taken, begins immediately after the first interval and is 2 decay times ($2\tau$) in length. When a gamma radiation detector is utilized, background gamma radiation is measured during a third detection interval III, and this background count rate preferably is made during an interval 3 decay times ($3\tau$) in length that is initiated 6 decay times ($6\tau$) after the end of the preceding neutron pulse. The next neutron pulse follows immediately after the end of the third detection interval.

In broad terms, the background count rate $N_3$ is subtracted proportionately from the first interval count rate $N_1$ and the second interval count rate $N_2$ to provide a measure of the accumulated count rates, $N_1(net)$ and $N_2(net)$, respectively, during the first and second time intervals due to the neutron population only. The ratio $N_1(net)/N_2(net)$ is then formed and the durations and delay after each neutron pulse of the first and second detection intervals are adjusted in a 1-to-2 ratio until the count rate ratio $N_1(net)/N_2(ret)$ equals 2.0. When this ratio is equal to 2.0, a condition of equilibrium is achieved and the thermal neutron decay time ($\tau$) is equal to the duration of the first detection interval. Departures from this equilibrium condition result in a loop action that corrects the gate widths until equilibrium is restored to the system.

In accordance with the Frentrop et al. teaching, the operation of the neutron source 24 is also controlled in the well tool as a function of a measured value of $\tau$. That is to say, both the duration of the individual neutron pulses and the elapsed time between successive pulses are varied in proportion to $\tau$. Hence, in FIG. 1 output signals from the $\tau$ loop 32 are passed over a conductor 40 to the source 24 to cause it to emit neutron pulses that are a specified multiple of $\tau$, e.g., $1\tau$, in duration and in intervals of a specified multiple of $\tau$, e.g., $10\tau$. Together with controlling the timings of the measurement periods, this method of downhole regulation of the source 24 results in highly efficient use of the source output, which in turn affords higher recording speeds and better quality logs.

The aforementioned detector gating program established by the $\tau$ loop 32 is also utilized, according to one embodiment of the invention, in selecting the portions of the signal train generated by the detector 26 which are to be transmitted to the surface. Thus, gating signals corresponding to the three detection intervals I, II and III are transmitted over conductors 42, 44 and 46, respectively, to the second inputs of the gate circuits 34, 36 and 38. When enabled by signals from the $\tau$ loop 32, therefore gate circuit 34 passes the detector signals generated during time intervals I (of $1\tau$ duration and occurring at $2\tau$ after the termination of the associated neutron pulse), gate 36 passes those signals generated during time intervals II (of $2\tau$ duration and commencing immediately upon termination of interval I), and gate 38 passes the detector signals generated during time interval III (of $3\tau$ duration and beginning $6\tau$ after the end of the preceding neutron pulse). The detector signals passed by the gates 34, 36 and 38 are applied to cable driver circuits 48 which code, time division mulitplex or otherwise prepare the signals for transmission to the earth's surface. Cable driver circuits for this purpose are well known and may, for example, be of the construction described in the aforementioned Frentrop et al. U.S. Pat. No. 3,662,179. An output signal from the $\tau$ loop 32 representative of the measured value of $\tau$ is also sent, over a conductor 52, to the cable driver circuits 48 for processing.

Output signals from the driver circuits 48 are coupled to a monocable or conductor bundle 50, as the case may be, in the armored cable 20 for transmission to the surface. As explained hereinafter, the present invention affords particularly useful information when a monocable is employed, as such monocables typically have poor pulse-transmission properties. At the surface, the signals are received in signal processing circuitry 54, where they are initially applied to signal conditioning circuits 56 for elimination of noise acquired during transmission, regeneration of the cable signals and decoding or demultiplexing of the signals for further processing. Circuits for performing these functions are also well known.

The signal conditioning circuits 56 output a signal representative of the downhole measured value of $\tau$, and this signal is sent over a conductor 58 to one channel of a recorder 60. The recorder 60 may conveniently include both tape recording apparatus and visual recording apparatus for producing the customary record of logging signals as a function of tool depth. The usual cable-following mechanical linkage, indicated diagrammatically at 62 in FIG. 1, is provided for this purpose.

As $\tau$ and $\Sigma$ are reciprocally related ($\tau=4.55/\Sigma$, may readily be obtained simply by processing the $\tau$ signal through a suitable converter circuit 64. The output from the converter circuit 64 may then be applied to a second channel of the recorder 60 to provide a depth record of $\Sigma$.

Also outputted by the signal conditioning circuits 56, over conductors 66, 68 and 70, are signals representative of the detector signals passed by gate circuits 34, 36 and 38, respectively, i.e., the signals generated by the detector during the respective time intervals I, II and III following each neutron pulse. The I, II, and III interval signals are counted in any conventional manner, e.g., in either digital or analog modes, by count rate circuits 72, 74 and 76, respectively, to provide average count rate values $N_1$, $N_2$ and $N_3$ for the three time intervals. If the analog counting mode is used, the count rate circuits 72, 74 and 76 preferably would have a long discharge time constant relative to the elasped time between successive neutron pulses. For the digital mode, the circuits 72, 74 and 76 would include the functions of counting, storing and binary-to-analog conversion. Appropriate circuits for this purpose are described in U.S. Pat. No. 3,609,366, granted Sept. 28, 1971, to Schwartz, and require modification only to include suitable circuitry for resetting the digital counters to zero after completion of each counting sequence. To that end, a signal coincident with the termination of gate III could be used to command the counter circuits to transfer the respective total counts to buffer registers and, after a suitable delay, provided by delay circuit, to allow the foregoing transfer to be accomplished, to reset the counters to zero. The outputs of the binary-to-analog converter circuits would thus be analog voltages which are proportional to the counting rates $N_1$, $N_2$ and $N_3$. If desired, suitable filters could be included in the output circuits of the binary-to-analog converters to filter out switching transients from the output signals.

As illustrated in FIG. 1, the average count rates $N_1$, $N_2$ and $N_3$ may be applied to channels of the recorder 60 over conductors 78, 80 and 82, respectively. Although all of the count rate data ($N_1$, $N_2$ and $N_3$) generated by the logging system preferably are recorded on magnetic tape in the recorder 60, not all of such data need be represented visually. Switches (not shown) may be incorporated into the logging system, therefore, for the log operator to select the particualr data which he wants displayed.

In accordance with the invention, the $N_1$ count rate signal is also applied, by way of a conductor 84, as one input of a subtract circuit 86. The other input to the subtract circuit 86, received on conductor 88, is representative of the quantity $\frac{1}{3} N_3$ and is formed by a divide-by-three circuit 90 which operates on the $N_3$ count rate signal supplied to it over a conductor 92 from the count rate circuit 76. Subtract circuit 86 performs the computation $N_1 - \frac{1}{3} N_3$.

The ⅓ $N_3$ signal from divide circuit 90 is also sent on conductor 94 to a mulitply-by-two circuit 96, thereby producing an output signal on a conductor 98 representative of the quantity ⅔ $N_3$. This signal, together with a signal representative of $N_2$ outputted on a conductor 100 by the count rate circuit 74, is inputted to a subtract circuit 102 in which the operation $N_2 - ⅔ N_3$ is carried out.

A comparison of the quantities $N_1 - ⅓ N_3$ and $N_2 - ⅔ N_3$ is then formed. Preferably, this is done by taking the ratio of the two quantities. Accordingly, in FIG. 1, the output signals from the subtract circuits 86 and 102 are sent over conductors 104 and 106, respectively, to a ratio circuit 108. A signal representative of the value of the ratio, designated QR to indicate "Quality Ratio," thus formed is transmitted over conductor 110 to the recorder 60.

Since the durations and times of occurrence of the time intervals I, II, and III were adjusted in the downhole circuits in the determination of $\tau$ so as to maintain the ratio $(N_1 - ⅓ N_3)/(N_2 - ⅔ N_3)$ substantially equal to 2.0, the ratio QR should also be equal to or closely approach 2.0. Deviations of QR from 2.0 imply either counting rate losses in the cable telemetry or an incorrect downhole $\tau$ determination. Deviations might also be expected at formation bed boundaries where a rapid change in $\tau$ occurs. It will be appreciated, therefore, that the ratio QR is indeed a quality factor which, when plotted as a function of logging depth, affords a quality control curve indicative of the validity of the logged values of $\tau$ and $\Sigma$ and also of the existence of signal losses on the monocable or conductor bundle 50. Although such cable transmission losses normally would not affect the accuracy of the recorded values of $\tau$ and $\Sigma$, since the $\tau$ measurement is made downhole, they could lead to error in the measurement of other formation parameters, and especially those measurements which are based upon counting rate measurements made from the surface-received signals. A more specific description of the usefulness of the QR ratio in this connection is set out hereinafter with respect to the embodiment of FIG. 3.

In any event, valuable information as to the accuracy of the downhole determination of $\tau$, and hence the surface determination of $\Sigma$, and of the quality of cable telemetry is afforded the log analyst, upon which he may base an evaluation of the validity of the logged data. Moreover, the QR curve also provides a check on the operation of the downhole equipment, which is particularly advantageous in tools of the type which employ downhole circuitry to control the detector gating and source pulsing operations of the tool as a function of a measured value of a formation characteristic.

Generally, the surface comparison of the counting rates used in deriving the quality information in accordance with the invention is preferably the same as the downhole comparison employed in determining $\tau$. The comparison $(N_1 - ⅓ N_3)/(N_2 - ⅔ N_3)$ is only one example of an appropriate comparison. Other relationships may be established between the counting rates in making the $\tau$ determination, depending upon the particular detector gating sequence utilized in the $\tau$ loop 32. For example, the times of occurrences and/or durations of the gates I, II and III could be varied from the sequence described above. Hence, the I and II intervals could be timed as in the aforementioned sequence, but interval III could be initiated at 7 decay times ($7\tau$) after the termination of the preceding neutron pulse instead of at 6 decay times ($6\tau$). Alternatively, intervals I and II could be separated by a period of $1\tau$ duration, with every fourth neutron burst being omitted, and the background measurement being made only during a period beginning at least 8 decay times ($8\tau$) after the third neutron pulse, as is described more fully in the commonly owned U.S. Pat. No. 3,566,116, granted Feb. 23, 1971, to Nelligan. As another alternative, it is also possible to employ a different surface counting rate comparison than that used in the downhole circuitry, though a like comparison at the surface is preferred, so long as the result of the surface comparison is functionally related to the quality of the downhole determination and/or the quailty of cable telemetry.

Figure 2:
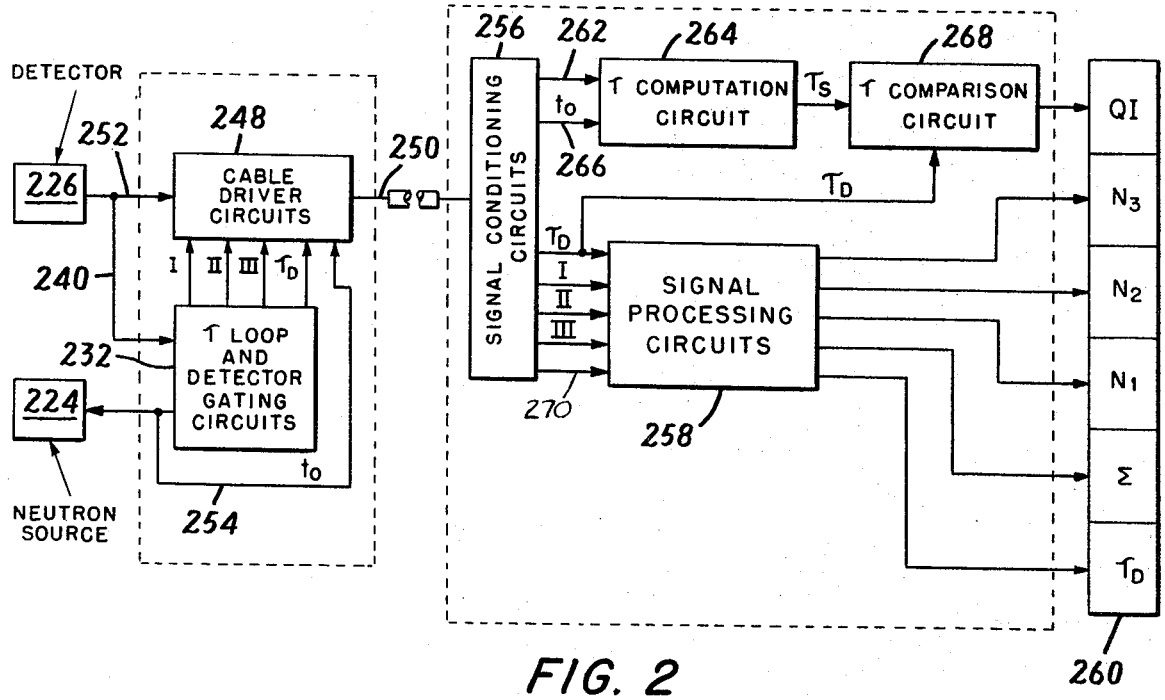
FIG. 2 is a schematic block diagram of a further embodiment of the invention, showing surface circuitry for computing a second measurement of a formation characteristic of interest.

If desired, the quality information may be obtained by making an independent computation of $\tau$ from the surface-received signals and comparing the surface and downhole $\tau$ measurements for agreement. This is illustrated in the embodiment of FIG. 2. As in the FIG. 1 embodiment, the neutron source 224, the radiation detector 226, the $\tau$ loop and detector gating circuits 232, and the cable driver circuits 248 are located in the well tool, i.e., downhole. These components function as in the FIG. 1 embodiment, determining a value of $\tau$ (herein designated $\tau_D$ to indicate that is is computed downhole) based on signals from the detector 226 and applying signals representative thereof and of the detector signals generated during the I, II and III detection intervals to the cable driver circuits 248 for transmission to the surface over the monocable or conductor bundle 250. If desired, pulses representative of all of the signals generated by the detector 226 may be sent uphole instead of or in addition to the I, II and III interval signals. Thus, the detector 226 may be coupled directly to the cable driver circuits 248 by a conductor 252, as well as by the conductor 240 to the $\tau$ loop and detector gating circuits 232. Also generated downhole and applied, over a conductor 254, to the cable driver circuits 248 is a synchronizing signal $t_o$ related in time to the end of each neutron pulse. As is described more fully hereinafter, the $t_o$ signal is required by the surface $\tau$ computation circuits.

Upon receipt in the surface circuitry, the transmitted signals are first conditioned, as previously described,, in signal conditioning circuits 256. Output signals from the circuits 256 representative of $\tau_D$ and the I, II and III interval detector signals are then sent to signal processing circuits 258, which may, for example, comprise the count rate circuit and $\tau-\Sigma$ converter circuit of the embodiment of FIG. 1. The processing circuits 258, in that instance, would function to derive the average counting rates $N_1$, $N_2$ and $N_3$ and $\Sigma$, and thereafter to couple signals representative of those values, together with the $\tau_D$ signal, to the recorder 260.

The signal conditioning circuits 256 also output signals representative of the entire detector signal train transmitted to the surface by means of the downhole conductor 252, the cable driver circuits 248 and the monocable or conductor bundle 250. These signals are applied on a conductor 262 to a surface $\tau$ computation circuit 264, which suitably may be of the same construction as the downhole $\tau$ loop 32 of FIG. 1 except that the components for controlling the operation of the neutron source are omitted. The circuit 264 includes, however, all of the functions necessary to compute $\tau$ from the signal train transmitted to it, including those of establishing the gate intervals I, II and III, measuring the counting rates $N_1$, $N_2$ and $N_3$, and adjusting the times of occurrence and durations of the gate intervals until the desired relationship between the counting rates, e.g., $(N_1 - \frac{1}{3} N_3)/(N_2 - \frac{2}{3} N_3)$ equals 2.0, is achieved. The operation of the $\tau$ computation circuit 264 must, of course, be referenced in time to the termination of each neutron pulse, this being necessary for control of the gating and pulsing functions. The downhole synchronizing signal $t_0$ is transmitted uphole and applied to the $\tau$ computation circuit 264 for this purpose, as indicated by the conductor 266. A signal representative of the value of $\tau$ thus determined (designated $\tau_S$ to indicate a surface computation) is applied as one input to a $\tau$ comparison circuit 268 and, if desired, may also be sent to the recorder 260. A signal representative of $\tau_D$ is likewise applied to the comparison circuit 268.

Absent counting rate losses in transmission or an incorrect $\tau_D$ determination, $\tau_S$ and $\tau_D$ should be substantially the same. Accordingly, in the embodiment of FIG. 2, the quality information may be obtained by comparing $\tau_D$ and $\tau_S$. This may be done in any suitable way, e.g., by taking their ratio or their algebraic difference in the circuit 268. The result of the comparison made by the circuit 268, designated QI to indicate generally a "Quality Index," may then be recorded as a function of depth in the recorder 260.

An advantage of the embodiment of FIG. 2 is that it permits not only a quality check on the operation of the downhole measuring and pulsing circuits and the quality of cable transmission, but that it affords a surface-computed measurement of $\tau$ which may be utilized, for example, in conjunction with further data processing steps. Consequently, the functions performed by the surface circuitry may readily be carried out either at the well site or at a central data processing station from stored representations of the well tool generated data. It further affords surface representations of the full detector signal train, which representations may be validated for accuracy of transmission by reference to the Quality Index provided by the $\tau_S$-to-$\tau_D$ comparison.

It will be appreciated, therefore, that while the signal processing circuits 258 have been described with particular reference to the counting rate circuits and $\tau$-$\Sigma$converter circuit of FIG. 1, they are also intended to designate generally any suitable computation or processing circuitry which might be employed in deriving logged values from the surface-received signals. To the extent that the accuracy of such values is influenced by the operational accuracy of the downhole measuring and pulsing circuits or by the fidelity of signal transmission uphole, information is afforded in accordance with the invention which is useful in validating the logged values. Thus, if desired, the full detector signal train may also be applied, over conductor 270, to the circuits 258.

FIG. 3 illustrates the application of the present invention to a logging system of the type disclosed in the aforementioned copending and commonly-owned application Ser. No. 356,151 of Nelligan. In accordance with the disclosure of that application, the well tool includes, in addition to a neutron source 324 and a first radiation detector 328. The electronics associated with the neutron source 324 and the near detector 326 may be essentially the same as in the embodiment of FIG. 1, by virtue of which the near detector signals are sent to a $\tau$ loop 332 and to near detector gating circuits 334. The near detector gating circuits 334 are controlled, as previously described, by gate enabling pulses generated by the $\tau$ loop 332 corresponding to the time intervals I, II and III. The detector signals passed by the near detector gating circuits are sent to cable driver circuits 336, along with a signal representative of the value of $\tau$ determined by the $\tau$ loop 332.

The I, II and III gate pulses from the $\tau$ loop 332 are also applied to far detector gating circuits 338, so that the far detector signals generated during the intervals I, II and III are coupled from the detector 328 to the cable driver circuits 336. As before, the driver circuits 336 operate to encode, mulitplex, or otherwise prepare the downhole signals for transmission to the surface over a monocable or conductor bundle 340. Although not illustrated in FIG. 3, all of the signals generated by the near detector 326 and the far detector 328 in response to the observed neutron populations in the formation may be transmitted to the surface in addition to or instead of the selected transmission of the near and far detector I, II and III interval signals.

After decoding, demultiplexing, etc., in signal conditioning circuaits 342, the surface-received signals representative of the I, II and III interval signals from the near and far detectors are applied to count rate circuits 344 and 346, respectively. These circuits each include three separate count rate circuits for measuring the average rates $N_1$, $N_2$, $N_3$, on the one hand, and $F_1$, $F_2$, and $F_3$, designating the average counting rates at the far detector during the intervals I, II and III, respectively, on the other hand. The count rate values $N_1$, $N_2$, $N_3$, $F_1$, $F_2$ and $F_3$ are then recorded, either on magentic tape or visually, or both, inseparate channels of a recorder 348. As in the embodiment of FIG. 1, a signal representative of $\tau$ is also recorded, as is the output of a $\tau$-$\Sigma$converter circuit 350.

Further in accordance with the embodiment of FIG. 1, the $N_1$, $N_2$ and $N_3$ counting rate signals are combined, i.e., the operations necessary to perform the computation $(N_1 - \frac{1}{3} N_3)/(N_2 - \frac{2}{3} N_3)$ are carried out, to compute the ratio QR. These operations are performed in the ratio (QR) computation circuits 352 of FIG. 3, which will be understood to include the divide, multiply, subtract and ratio forming circuits of FIG. 1. The value of QR thus derived is also logged by the recorder 348.

Pursuant to the teachings of the Nelligan application, the $F_1$, $F_2$ and $F_3$ count rate measurements and the $N_1$ and $N_3$ count rate measurements are combined in ratio (R) computation circuits 354 to provide a determination of the ratio R, where $R = (N_1 - \frac{1}{3} N_3)/(F_1 + F_2 - F_3)$. As disclosed by Nelligan, the ratio R, when cross plotted against the corresponding logged value of $\Sigma$ at a given depth level, allows the determination of apparent values of formation porosity and water salinity in cased holes. This information permits estimation of the apparent water saturation of formations surrounding the borehole, notwithstanding that the borehole is cased. So that reliable determinations of porosity, water salinity, and water saturation may be made, it is desirable to ascertain that the logged values of $\Sigma$ and the ratio R are accurate. The present invention affords this information, by virtue of the provision of the quality ratio QR. As previously, mentioned, the ratio QR is indicative of accuracy of the downhole determination of $\tau$, and hence of the computation of $\Sigma$based on that measurement. Since it also affords knowledge as to signal losses in the cable, it is likewise representative of the accuracy of the ratio R, which is determined from surface-received signals and is subject to error if signal losses occur in transmission.

Figure 4:
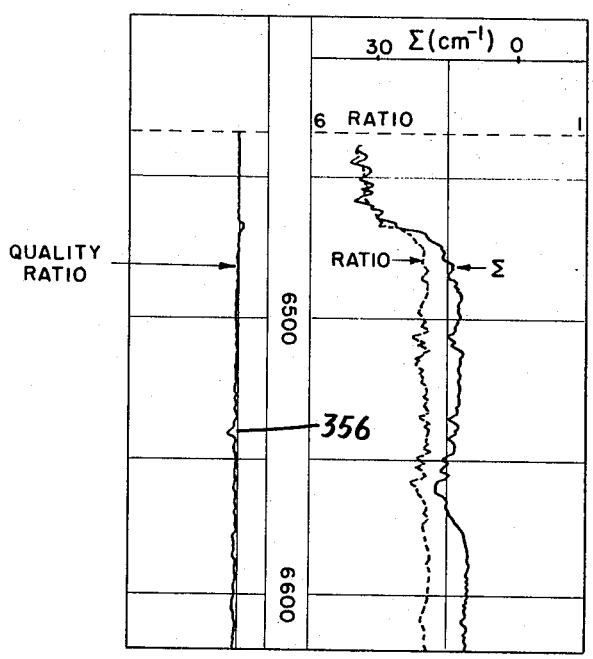
FIG. 4 is a representation of a portion of a log typifying those produced by the apparatus of FIG. 3.

The log depicted in FIG. 4 is illustrative of the use of the quality ratio QR in validating logging values of R and $\Sigma$. In track 1 is the quality ratio curve, as plotted against the reference line 356 representing a value of QR=2.0. The R curve and the $\Sigma$ curve are recorded in tracks 2 and 3. Over the depth interval of 6440' to 6500', the quality ratio curve is substantially coincident with the reference line, thereby indicating that the downhole $\tau$ measurements is substantiallly free from error and that signal losses on the cable are not significant. Hence, both the logged value of $\Sigma$ and of the ratio R may be accepted as valid. The sharp anomaly on the quality ratio curve appearing at approximately 6542' is attributable to the effect of high voltage discharges (an infrequent occurrence on the downhole $\tau$ computation circuits. This indicates that the value of $\tau$, and thus of $\Sigma$, at that depth level is suspect. More importantly, abrupt deviations in the quality control curve, such as that appearing at 6465', may also be expected at formation boundaries where a rapid change in $\tau$ occurs. Returning to FIG. 4, the small, rather constant deviation from the reference line (QR = 2.0) over the 6580' to 6610' depth interval is attributable to cable transmission losses, which may result, for example, where the casing is filled with gas, resulting in detector counting rates in excess of the transmission capacity of the cable telemetry system. In this instance, the logged value of $\Sigma$ is correct, since it is not influenced by signal loss on the cable, but the ratio R is in error.

Although the invention has been described herein with reference to specific embodiments thereof, many modifications and variations of such embodiments may be made by one skilled in the art without departing from the inventive concepts disclosed. For example, while the specific embodiments of FIGS. 1-3 illustrate circuitry for practicing the invention at the well site, it will be understood that all of the downhole generated data, e.g., $\tau$ and the detector signals, and the count rate values $N_1$, $N_2$, $N_3$, $F_1$, $F_2$ and $F_3$ could be recorded on magnetic tape, and the comparisons $(N_1 - \frac{1}{3} N_3)/(N_2 - \frac{2}{3} N_3)$, $\tau_S/\tau_D$, etc., carried out at a remote location, as, for instance, by use of a general purpose digital computer. Accordingly, all such modifications and variations are intended to be included within the spirit and scope of the appended claims.

We claim:
1. A method of investigating earth formations traversed by a borehole, comprising:
   moving through the borehole a well tool of the type including a neutron source for repetitively irradiating an earth formation with pulses of neutrons and at least one radiation detector spaced from the neutron source for generating signals representative of the resulting neutron populations between pulses in the formation opposite said one detector;
   deriving a measurement in the well tool of a characteristic of the formation from said one radiation detector signals;
   transmitting to the earth's surface a signal representative of said formation characteristic measurement and signals representative of at least selected portions of said one radiation detector signals; and
   deriving a representation at the earth's surface from representations of said transmitted detector-related signals which is functionally related to at least one of the quality of said formation characteristic measurement and the quality of transmission of said detector-related signals.

2. The method of claim 1 wherein the step of deriving said quality-related representation comprises:
   deriving a measurement at the earth's surface of said formation charateristic from said representations of said transmitted detector-related signals; and
   comparing a representation of said transmitted measurement signal and a representation of said surface-derived measurement to provide a representation of the correlation between said well tool-derived measurement and said surface-derived measurement.

3. The method of claim 2 wherein said signal-transmitting step comprises transmitting to the earth's surface signals representative of all of said one detector signals.

4. The method of claim 3 wherein said well tool-measurement deriving step comprises:
   measuring those of said one radiation detector signals generated during variable measurement periods between neutron pulses; and
   controlling the repetition rate and the duration of said neutron pulses and the times of occurrence and the durations of said measurement periods as a function of said well tool-derived characteristic measurement.

5. The method of claim 1 wherein:
   said well tool-measurement deriving step comprises observing those of said one radiation detector signals generated during first and second time intervals between neutron pulses and combining said well tool first and second time interval signals to provide said formation characteristic measurement;
   said signal-transmitting step comprises transmitting to the earth's surface signals representative of at least those of said one radiation detector signals generated during said first and second time intervals; and
   said quality-representation deriving step comprises combining representations of said transmitted signals representative of said first and second time interval signals to provide said quality representation.

6. The method of claim 5 wherein:
   said well tool-signal combining step comprises forming a ratio of the well tool-observed signals from said first and second time intervals; and
   said surface-signal combining step comprises forming a like ratio of representations of said transmitted signals representative of said first and second time interval signals.

7. The method of claim 5 wherein:
   said one radiation detector is responsive to gamma radiation within the borehole following said neutron pulses;
   said first and second time intervals are located in time relative to each neutron pulse such that the detector signals generated during said first and second intervals are representative of the neutron population in the formation following each pulse;

said well tool-measurement deriving step further comprises observing those of said detector signals generated during a third time interval between neutron pulses, said third time interval being located in time relative to each neutron pulse such that the detector signals generated during said third interval are representative of background radiation, combining said first interval signals and said third interval signals to provide a first well tool background-corrected neutron population measurement, combining said second interval signals and said third interval signals to provide a second well tool background-corrected neutron population measurement, and combining said first and second well tool background-corrected measurements to provide said formation characteristic measurement;

said signal-transmitting step further comprises transmitting to the earth's surface signals representative of said third time intervals observed signals; and said surface-signal combining step further comprises combining representations of said transmitted signals representative of said first time interval signals and representations of said transmitted signals representative of said third time interval signals to provide a first surface background-corrected neutron population measurement, combining representations of said transmitted signals representative of said second time interval signals and representations of said transmitted signals representative of said third interval signals to provide a second surface background-corrected neutron population measurement, and combining said first and second surface background-corrected measurements to provide said quality representation.

8. The method of claim 7 wherein:

said well tool-measurements combining step comprises forming a ratio of said first and second well tool background-corrected measurements; and said surface-measurements combining step comprises forming a like ratio of said first and second surface background-corrected measurements.

9. The method of claim 1 wherein:

said well tool includes a second radiation detector spaced from the neutron source and said one radiation detector for generating signals representative of the neutron populations between pulses in the formation opposite said second detector; and said signal-transmitting step comprises transmitting to the earth's surface signals representative of at least selected portions of said second radiation detector signals, said quality representation being functionally related to the quality of transmission of both said first and second detector-related signals.

10. A method of investigating the quality of well logging data derived from a well tool which is adapted to be moved through a borehole and which is of the type that repetitively irradiates an earth formation with pulses of neutrons, generates signals representative of the neutron populations in the formation between neutron pulses and, in response thereto, derives a measurement in the well tool of a characteristic of the formation, and transmits to the earth's surface a signal representative of said characteristic measurement and signals representative of at least selected portions of said detector signals, comprising:

deriving a representation at the earth's surface from representations of said transmitted detector-related signals which is functionally related to at least one of the quality of said formation characteristic measurement and the quality of transmission of said detector-related signals.

11. The method of claim 10 wherein the step of deriving said quality-related representation comprises:

deriving a measurement at the earth's surface of said formation characteristic from said representations of said transmitted detector-related signals; and comparing a representation of said transmitted measurement signal and a representation of said surface-derived characteristic measurement to provide a representation of the correlation between said well tool-derived measurement and said surface-derived measurement.

12. The method of claim 10 wherein the well tool is further of the type which derives said formation characteristic measurement by combining functions of those of said neutron population signals generated during first and second time intervals between neutron pulses to provide a comparison of the neutron populations in the formation during said first and second time intervals and transmits to the earth's surface signals representative of said first and second time interval generated signals, and wherein said quality representation-deriving step comprises combining functions of representations of said transmitted signals representative of said first and second time interval signals to provide a representation of the comparison of the neutron populations in the formation during said first and second time intervals.

13. The method of claim 12 wherein said well tool and surface function combining steps comprise forming like ratios of functions of said first and second time interval signals and of functions of said first and second time interval transmitted-signal representations, respectively.

14. Apparatus for investigating earth formations traversed by a borehole, comprising:

a well tool including a neutron source for repetitively irradiating an earth formation with pulses of neutrons and at least one radiation detector spaced from the neutron source for generating signals representative of the resulting neutron populations between pulses in the formation opposite said one detector;

means in the well tool for deriving a measurement of a characteristic of the formation in response to said one radiation detector signals;

means for transmitting to the earth's surface a signal representative of said formation characteristic measurement and signals representative of at least selected portions of said one radiation detector signals; and means at the earth surface repsonsive to representations of said transmitted detector-related signals for deriving a representation which is functionally related to at least one of the quality of said formation characteristic measurement and the quality of transmission of said detector-related signals.

15. The apparatus of claim 14 wherein the quality-related representation deriving means comprises:

means for deriving a measurement of said formation characteristic in response to said representations of said transmitted detector-related signals; and means for comparing a representation of said transmitted measurement signal and a representation of said surface-derived measurement to provide a representation of the correlation between said well tool-derived measurement and said surface-derived measurement.

16. The apparatus of claim 15 wherein said signal-transmitting means comprises means for transmitting to the earth's surface signals representative of all of said one detector signals.

17. The apparatus of claim 14 wherein:
said well tool-measurement deriving means comprises means for observing those of said one radiation detector signals generated during first and second time intervals between neutron pulses and means for combining said well tool first and second time interval signals to provide said formation characteristic measurement;

said signal-transmitting means comprising means for transmitting to the earth's surface signals representative of at least those of said one radiation detector signals generated during said first and second time intervals; and said quailty-representation deriving means comprises means for combining representations of said transmitted signals representative of said first and second time interval signals to provide said quality representation.

18. The apparatus of claim 17 wherein:
said well tool-signal combining means comprises means for forming a ratio of the well tool-observed signals from said first and second time intervals; and said surface-signal combining means comprises means for forming a like ratio of representations of said transmitted signals representative of said first and second time interval signals.

19. The apparatus of claim 17 wherein:
said one radiation detector is responsive to gamma radiation within the borehole following said neutron pulses;

said first and second time intervals are located in time relative to each neutron pulses such that the detector signals generated during said first and second intervals are representative of the neutron population in the formation following each pulse;

said well tool-measurement deriving means further comprises means for observing those of said detector signals generated during a third interval between neutron pulses, said third time interval being located in time relative to each neutron pulse such that the detector signals generated during said third interval are representative of background radiation, means for combining said first interval signals and said third interval signals to provide a first well tool background-corrected neutron population measurement, means for combining said second interval signals and said third interval signals to provide a second well tool background-corrected neutron population measurement, and means for combining said first and second well tool background-corrected measurements to provide said formation characteristic measurement;

said signal-transmitting means furhter comprises means for transmitting to the earth's surface signals representative of said third time interval observed signals; and said surface-signal combining means further comprises means for combining representations of said transmitted signals representative of said first time interval signals and representations of said transmitted signals representative of said third time interval signals to provide a first surface background-corrected neutron population measurement, means for combining representations of said transmitted signals representative of said second time interval signals and representations of said transmitted signals representative of said third time interval signals to provide a second surface background-corrected neutron population measurement, and means for combining said first and second surface background-corrected measurements to provide said quality representation.

20. The apparatus of claim 19 wherein:
said well tool-measurements combining means comprises means for forming a ratio of said first and second well tool background-corrected measurements; and said surface-measurements combining means comprises means for forming a like ratio of said first and second surface background-corrected measurements.

21. The apparatus of claim 14 wherein:
said well tool includes a second radiation detector, spaced from the neutron source and said one radiation detector, for generating signals representative of the neutron populations between pulses in the formation opposite said second detector; and said signal-transmitting means comprises means for transmitting to the earth's surface signals representative of at least selected portions of said second radiation detector signals.

* * * * *

UNITED STATES PATENT OFFICE
CERTIFICATE OF CORRECTION

Patent No. 3,868,505  Dated February 25, 1975

Inventor(s) L.A.JACOBSON, W.B.WALL and C.W.JOHNSTONE

It is certified that error appears in the above-identified patent and that said Letters Patent are hereby corrected as shown below:

Col. 3, line 18, "logging" should read --logged--;
Col. 5, line 35, after "therefore" insert a comma;
Col. 5, line 36, "intervals" should read --interval--;
Col. 5, line 39, "intervals" should read --interval--;
Col. 6, line 10, before "may" insert --where $\tau$ is in microseconds and $\Sigma$ is in $cm^{-1}$) a measurement of $\Sigma$--;
Col. 6, line 29, "elasped" should read --elapsed--;
Col. 6, line 57, "particualr" should read --particular--;
Col. 8, line 15, "quailty" should read --quality--;
Col. 8, line 26, "is is" should read --it is--;
Col. 8, line 51, "circuit" (first occurrence) should read --circuits--;
Col. 9, line 65, before "328" insert --326, a second, more distantly spaced radiation detector--;
Col. 10, line 14, "mulitplex" should read --multiplex--;
Col. 10, line 24, "circuaits" should read --circuits--;
Col. 10, line 33, "magentic" should read --magnetic--;
Col. 10, line 34, "inseparate" should read --in separate--;
Col. 11, line 7, "logging" should read --logged--;
Col. 11, line 14, "measurements" should read --measurement--;
Col. 11, line 14, "substantiallly" should read --substantially--;
Col. 11, line 20, "occurrence" should read --occurrence)--;
Col. 13, line 19, "intervals" should read --interval--;
Col. 14, line 61, "reponsive" should read --responsive--;
Col. 16, line 14, "furhter" should read --further--.

Signed and Sealed this twenty-second Day of July 1975

[SEAL]

Attest:

RUTH C. MASON
Attesting Officer

C. MARSHALL DANN
Commissioner of Patents and Trademarks